UNITED STATES PATENT OFFICE.

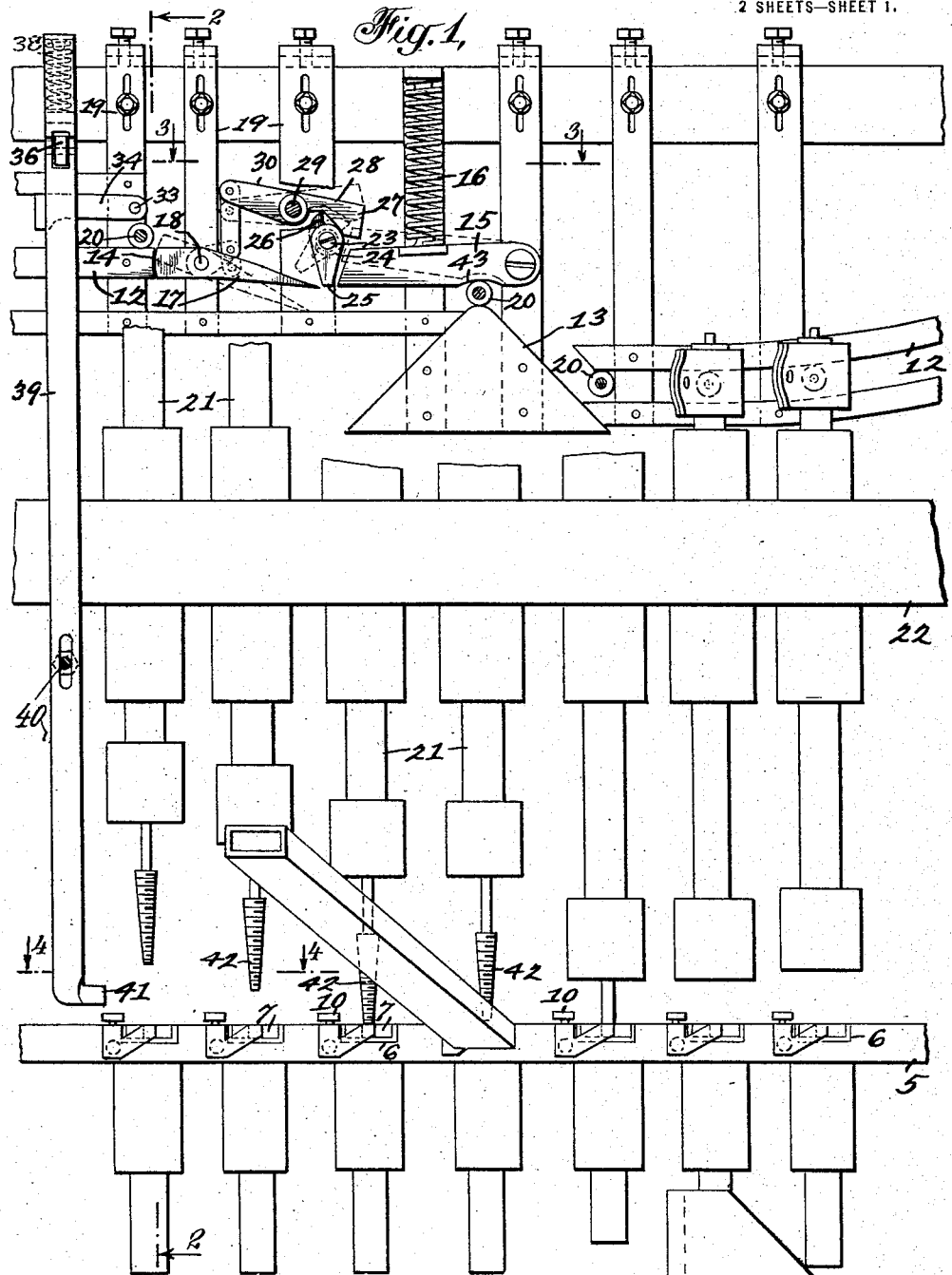

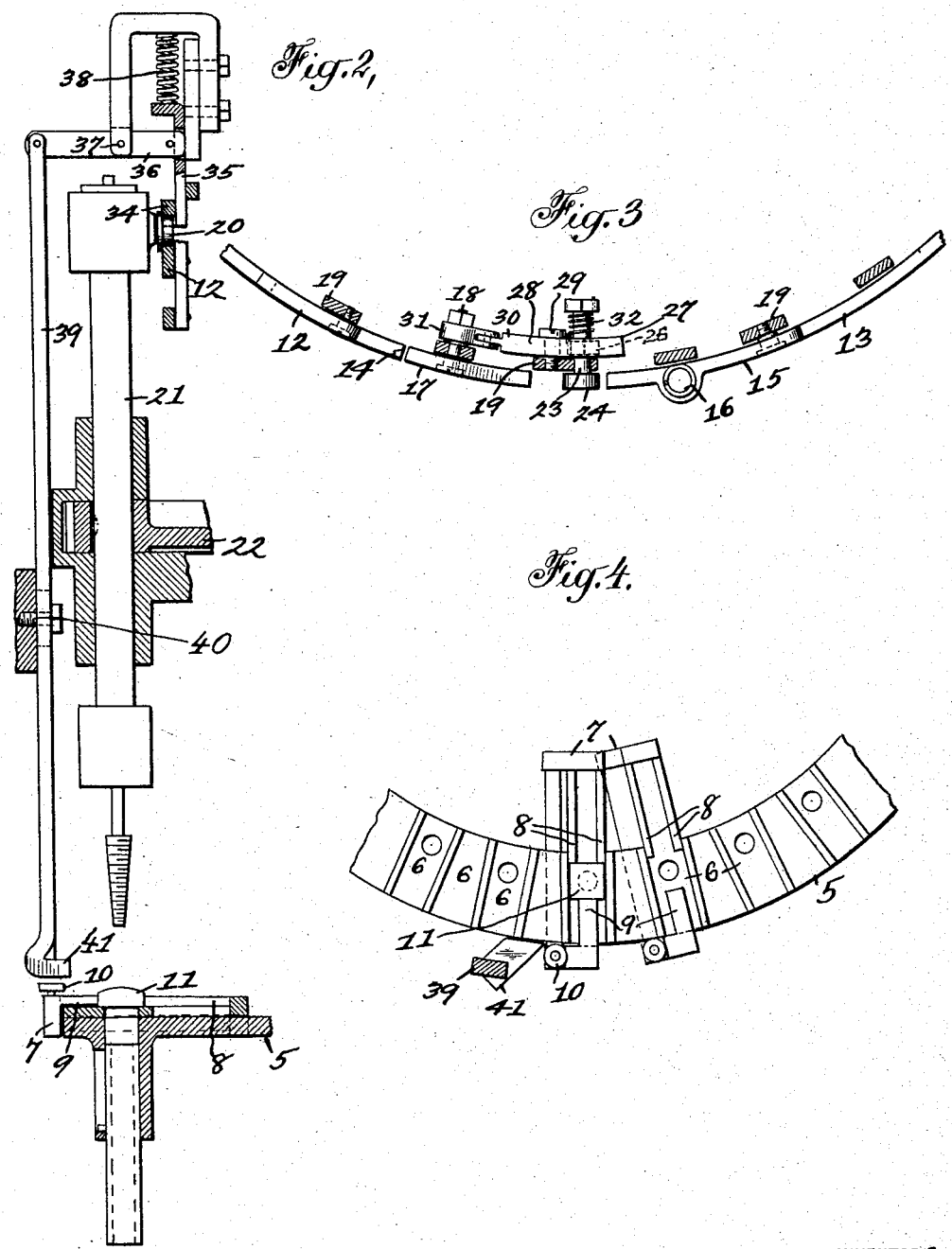

THOMAS MARION DANIELS AND JULIUS C. HOLSCHEMACHER, OF CHICAGO, ILLINOIS.

NUT-TAPPING MACHINE.

1,175,132. Specification of Letters Patent. Patented Mar. 14, 1916.

Application filed July 8, 1915. Serial No. 38,666.

*To all whom it may concern:*

Be it known that we, THOMAS M. DANIELS, and JULIUS C. HOLSCHEMACHER, citizens of the United States, and residents of Chicago, in the county of Cook and State of Illinois, have invented certain new and useful Improvements in Nut-Tapping Machines, of which the following is a specification.

This invention is an improvement over the machine shown and described in our Letters Patent of the United States, bearing Number 1,141,779, issued to us on the 1st day of June, 1915, and the main object thereof is to render any of the tap spindles inoperative in the event of the nut blank thereunder being defective, either by being under size or by not having been provided with the hole to be tapped.

A further object is to provide means, in such event, for removing the defective blank from the machine automatically.

Our invention is fully described in the following specification, of which the accompanying drawings form a part, in which like characters refer to like parts in each of the views, and in which;—

Figure 1 is a fragmentary elevation of the machine above referred to, showing our present invention in operative position thereon; Fig. 2 is a section taken on the line 2—2 of Fig. 1; Fig. 3 is a section taken on the line 3—3 of Fig. 1; and Fig. 4 is a section taken on the line 4—4 of Fig. 1.

In the machine referred to a plurality of vertically movable spindles are simultaneously rotated and carry taps arranged, initially, over the respective ones of a plurality of nut blanks, the frame carrying the spindles and the table carrying the blanks being simultaneously revolved with respect to their support but being fixed with respect to each other. The spindles are forced downwardly by means of an inclined band acting in the manner of a cam upon a roller on each spindle held against said band by suitable springs. This downward spindle movement forced the taps into the respective nut blanks and therethrough, and it was in order to prevent this spindle movement downwardly that this invention was conceived, in order to prevent injury to the machine or to a tap in the event of a defective blank having been fed thereunder.

In the drawings forming a part of this application we have shown the table 5 for carrying the nut blanks, a pocket 6 being provided for each blank arranged, in the form shown, on a line radial of said plate or table. In the present form the nut blank is held in position in its respective pocket 6 by means of a slide 7 having two arms 8 and 9 for nut engagement and provided with a roller 10 on the upper side thereof, the slide and nut being movable as a unit but said slide being held in normal position by means of a suitable spring, not shown, a defective nut blank 11 being shown in Figs. 2 and 4.

In the patent referred to the cam for moving the tap spindles downwardly is designated "24", and its counterpart is shown at 12 in the drawings filed herewith and, while a plurality of spindles and nut pockets are shown, the following explanation will be confined to but one spindle and pocket and the operation traced with respect thereto. An inclined cam "25" is also shown in the said patent, and its counterpart shown at 13 in the present drawings.

As shown at 14, Figs. 1 and 3, the cam 12 is terminated to provide an open space between the end thereof and the top of the cam 13, this having been shown as continuous in the said patent, and we provide a pivoted arm 15 over the cam 13 for partially bridging this space, said arm being normally maintained in lowermost position by means of a spring 16 though yieldingly as will be later explained. A switch 17 also partially bridges this space and is carried by a shaft 18 supported in one of the hangers 19 for the cams 12 and 13, this switch presenting an under edge in line with the under edge of the cam 12 when in normal position, but presenting an inclined upper edge to the roller 20 on the spindle 21, as shown by dotted lines in Fig. 1, when moved from its normal position. The cams 12 and 13 are fixed, but the spindle carrier 22 revolves as will be seen by examination of the patent referred to, thus moving the spindle roller along the cams and the switch 17.

Pivoted at 23 to another hanger 19 is a lever 24 which is provided with an arm 25 extending to a point closely adjacent the free end of the arm 15 and with an arm 26 bearing against a cam edge on the under side of one arm 27 of a lever 28 pivoted at 29 and the other arm 30 of which is linked to a crank-arm 31 secured to the shaft 18. When the lever 24 is moved from normal position, the lever 28 is also moved, thus throwing the switch from the position shown in full lines to the position indicated by dotted lines in Fig. 1. When the actuating force is released from the arm 25, the levers 24, and 28, and switch 17 resume their normal positions by means of a coil spring 32, Fig. 3.

Pivoted at 33 to a fixed hanger 19 is an arm 34 which is in pivotal connection with a link 35, Fig. 2, in turn pivoted to a lever 36 pivoted at 37, a spring 38 normally maintaining the arm 34 and connected parts in lowered position. The outer end of the lever 36 is pivoted to a vertically movable bar 39 slidably guided by means of a bolt 40 and carrying a cam plate 41 at its lower end, normally above the tops of the rollers 10 on the nut blank slides 7, Figs. 1, 2, and 4.

When a defective nut blank is in the pocket directly beneath the spindle being described, the tap 42 may be moved downwardly by its spindle until said tap touches the blank, this being a very slight movement as determined by the cam edge 43 on the under side of the arm 15, Fig. 1; if the tap movement is opposed by the defective blank, the arm 15 must rise against its spring 16, thus exposing the arm 25 of the lever 24 to the approaching roller 20 and which, on contact therewith, moves the lever 24 on its pivot, thus moving the lever 28 on its pivot, and, in turn, throwing the switch into the position indicated by dotted lines. The roller 20 now impinges on and moves upwardly on the upper edge of the switch 17 and to the upper side of the cam 12, free from any possibility of being forced downwardly to carry the tap toward the defective blank from which it had just been raised. In the forward movement of the roller 20 it rolls beneath the arm 34 which has a cam shaped under edge, and raises the free end of this arm, thereby rocking the lever 36 on its pivot and moving the bar 39 and attached cam plate 41 downwardly whereby the latter will be in the path of the approaching roller 10 on the respective slide 7. Upon impact of this roller 10 with the cam plate 41, the slide 7 is moved outwardly to carry the defective nut blank over the edge of the table 5, clear of the machine. As soon as the roller 20 passes the movable parts with which it engages, said parts resume their normal positions as shown in full lines, whereby the roller 20 is maintained beneath the cam 12 and the tap is thus forced into and through the respective nut blank to tap the same. When a spindle and tap have been raised out of operative connection with the cam 12 by the roller 20 thereof having been switched above said cam, the roller remains on the upper side of said cam until the end thereof is reached, as shown to the right of the inclined cam 13 in Fig. 1, after which the roller 20 of this spindle follows the normal path beneath the cam 12 if a normal blank is thereunder.

It will thus be seen that absolute protection is provided against any possibility of injury to the machine or taps because of defective nut blanks, and that the latter are thrown out of the machine; although we have a present preferred embodiment of the invention, we do not limit ourselves thereto, as we may make changes thereover, within the scope of the following claims, without departing from the spirit of our invention or sacrificing its advantages.

Having fully described our invention, what we claim as new, and desire to secure by Letters Patent, is:—

1. The combination with a nut tapping machine provided with a vertically movable spindle, a tap therein, a roller on said spindle, a cam for moving said spindle, and means for holding a nut blank beneath said tap, of means controlled by a defective nut blank for raising said spindle and tap out of operative engagement with said cam.

2. The combination with a nut tapping machine provided with a vertically movable spindle, a tap therein, a roller on said spindle, a cam for moving said spindle, and means for holding a nut blank beneath said tap, of means controlled by a defective nut blank for throwing said nut blank out of said machine.

3. The combination with a nut tapping machine provided with a vertically movable spindle, a tap therein, a roller on said spindle, a cam for moving said roller and spindle, and means for holding a nut blank beneath said tap, of a switch, and means controlled by a defective nut blank for moving said switch to deflect said roller from its normal course to prevent downward spindle movement.

4. The combination with a nut tapping machine provided with a vertically movable spindle, a tap therein, a roller on said spindle, a cam for moving said roller and spindle, and means for holding a nut blank beneath said tap, of a switch arranged along the length of said cam, and means controlled by a defective blank for throwing said switch for guiding said roller to the upper side of said cam from the under side thereof to prevent downward movement of said spindle and tap.

5. The combination with a nut tapping machine provided with a vertically movable spindle, a tap therein, a cam for moving said spindle, and means for holding a nut blank beneath said tap, of a slide for holding said blank, and means controlled by a defective blank for moving said slide to throw said defective blank out of said machine.

6. The combination with a nut tapping machine provided with a vertically movable spindle, a tap therein, a cam for moving said spindle, and means for holding a nut blank beneath said tap including a slide, a roller on said slide, a cam arranged normally over said roller, and means controlled by a defective nut blank for lowering said last named cam downwardly into the path of said roller to move said slide to throw said defective nut blank out of said machine.

In testimony whereof we have signed our names to this specification in the presence of two subscribeing witnesses.

THOMAS MARION DANIELS.
JULIUS C. HOLSCHEMACHER.

Witnesses:
JULIUS J. AUGUSTUS,
HENRY HERMES.

Copies of this patent may be obtained for five cents each, by addressing the "Commissioner of Patents, Washington, D. C."